(12) United States Patent
Dionysiou

(10) Patent No.: US 7,602,671 B2
(45) Date of Patent: Oct. 13, 2009

(54) OIL HEATING TANK METER FOR MONITORING A PLURALITY OF VARIABLES

(76) Inventor: Constantinos Dionysiou, 21-02 147th St., Whitestone, NY (US) 11357

(*) Notice: Subject to any disclaimer, the term of this patent is extended or adjusted under 35 U.S.C. 154(b) by 0 days.

(21) Appl. No.: 11/827,068

(22) Filed: Jul. 10, 2007

(65) Prior Publication Data

US 2009/0016164 A1    Jan. 15, 2009

(51) Int. Cl.
*G01S 15/08* (2006.01)
*G01F 23/28* (2006.01)

(52) U.S. Cl. ............ 367/99; 367/909; 367/112; 73/290 V; 73/290 R

(58) Field of Classification Search ......... 73/290 R, 73/290 VR, 290 V; 367/87, 99, 112, 909
See application file for complete search history.

(56) References Cited

U.S. PATENT DOCUMENTS

| | | | |
|---|---|---|---|
| 3,570,532 A | 3/1971 | Lendino | |
| 4,853,694 A * | 8/1989 | Tomecek | 73/290 V |
| 4,894,810 A | 1/1990 | Jukkala | |
| 5,029,194 A | 7/1991 | Young et al. | |
| 5,377,114 A | 12/1994 | Gross | |
| 5,586,085 A * | 12/1996 | Lichte | 367/99 |
| 5,631,875 A | 5/1997 | Romes et al. | |
| 5,671,190 A | 9/1997 | Kroemer et al. | |
| 6,624,881 B2 | 9/2003 | Waibel et al. | |
| 6,662,649 B1 * | 12/2003 | Knight et al. | 73/290 V |
| 6,698,289 B1 | 3/2004 | Lemcke et al. | |
| 6,986,294 B2 * | 1/2006 | Fromme et al. | 73/865.8 |
| 7,140,253 B2 | 11/2006 | Merki et al. | |
| 2005/0039005 A1 * | 2/2005 | Dyck et al. | 713/168 |
| 2006/0000276 A1 * | 1/2006 | Ferren et al. | 73/290 V |
| 2006/0268261 A1 | 11/2006 | Chien et al. | |

* cited by examiner

*Primary Examiner*—Ian J Lobo
(74) *Attorney, Agent, or Firm*—Carter, DeLuca, Farrell & Schmidt, LLP

(57) ABSTRACT

A method for measuring a distance of an object with a distance measuring unit, the method including: sending a first signal from the distance measuring unit toward the object; receiving a second signal from the object; and measuring the second signal via the distance measuring unit; wherein the distance measuring unit is enclosed within an electronic meter that is attachable to a fuel heating tank, the electronic meter used for tracking, verifying, and recording one or more variables.

11 Claims, 5 Drawing Sheets

OIL HEATING TANK METER FOR MONITORING A PLURALITY OF VARIABLES

BACKGROUND

1. Technical Field

The present disclosure relates to fuel heating tank. More particularly, the present disclosure relates to a oil heating tank meter that is capable of monitoring, verifying, tracking, and recording a plurality of variables, including, but not limited to, the approximate amount of fuel in a heating tank, the approximate amount of fuel delivered, the approximate amount of fuel consumed over a predetermined time period, and the dates that fuel was delivered.

In household-heating systems which utilize oil as a source of fuel, a fuel oil tank or oil heating tank is customarily found in the basement of the home for storage of large quantities of fuel oil. The owner of the home usually has a contract with a local fuel oil company to make automatic deliveries of fuel oil to the home as required. The fuel oil company determines the frequency of deliveries based on calculations of the weather and the size of the home. The deliveries are often scheduled when it is calculated that more than 60 to 70 percent of the capacity of the tank has been consumed by the oil burner. Occasionally, however, due to the weather or other factors, the calculations fail to keep pace with the consumption of the oil burner, and, as a result the supply of fuel oil in the home becomes exhausted. When notified by its customer, the fuel oil company must not only make an immediate delivery of oil but enter the customer's home to prime the oil burner pump and remove possible sediment deposits and sludge, which have been drawn in by the oil burner from the bottom of the tank. In other words, the customer is heavily dependent on the fuel oil company to determine when more oil needs to be delivered.

Accordingly, the present disclosure provides a level detection and indicating apparatus connected to an electronic reading apparatus, which permits the owner of the heating oil tank to efficiently schedule deliveries closer to the day when the fuel oil supply will be exhausted. The present disclosure focuses on furnaces using oil and specifically on detachable electronic meters that are used on oil furnaces for monitoring a plurality of variables, including, but not limited to, the approximate amount of fuel in a heating tank, the approximate amount of fuel delivered, the approximate amount of fuel consumed over a predetermined time period, and the dates that fuel was delivered.

2. Description of the Related Art

A method of using a mechanical fuel oil meter for verification and monitoring means is described in U.S. Pat. No. 5,377,114. The heating unit includes a first meter connected to an inlet of a storage tank to verify the amount fuel oil being delivered to the tank; a computer, connected to the first meter, to receive information concerning the time, date, amount of fuel oil delivered and means to enter information concerning the cost of fuel per gallon of the fuel being delivered at that time and to record and track the time and date when the heating unit is running; and a second meter connected between the tank and the heating unit and to the computer to track and record information concerning the amount of fuel being consumed by the heating unit during operation.

SUMMARY

In the present disclosure, some of the variables of interest are determining the amount of heating oil in a heating tank, the amount of heating oil consumed over a specified period of time, and the amount of heating oil to be delivered for refilling the oil heating tank. One method of measuring the amount of heating oil in a heating tank is to measure the distance between the top surface of the heating oil and the top of the heating tank. There are several distance measurement methods that may be utilized. Two of the most common distance measurement methods are measuring a distance by means of ultrasound pulses and measuring a distance by means of a laser.

In the first method, ultrasound pulses are used to measure a distance. Ultrasound is similar to the well known sound, except for its frequency, which is usually above 20 kHz. Therefore, ultrasound can only be handled by using ultrasound sensors, which transform the pressure vibrations into electrical signals and vice versa. By nature, the laws for ultrasound are the same as the laws of electromagnetic waves, except its propagation velocity is millions of times smaller. Because of this small sound velocity, time-of-flight measurements lead to high space resolution using only moderate electronic effort. In one microsecond, airborne sound propagates 0.33 mm. If one transmits an ultrasound pulse which is reflected by a wall, the same as a mirror, the distance to the wall can be measured by measuring the time-of-flight.

Ultrasonic distance sensors, which work according to the pulse-echo method, transmit a sonic signal and receive in the form of an echo the signal reflected from the object (e.g., fuel). The propagation time of the acoustic signal transmitted by the sonic transmitter until arrival at the sonic receiver gives a measure of the absolute path distance, by which is meant the path distance from the sonic transmitter to the object and back. A single sonic transducer is frequently used for alternate transmission and reception.

Several methods are known to perform contactless measurements of distance with the aid of ultrasound transit-time measurements. In connection with devices for measuring the distance to a liquid, a short ultrasound signal is emitted by a sound transducer and, if an obstacle (e.g., a reflector, or fuel) is present, it is reflected by the latter and received by the sound transducer again. From the transit time, the distance between the sound transducer and the reflecting object is calculated.

Since the level of the reflected signal depends not only on the level of the signal emitted but also on the distance between the ultrasound transducer and the reflector and on the quality of the reflector, problems arise in the evaluation of the echo signal. According to U.S. Pat. No. 5,631,875, one way of using the echo signal to generate a time marker is to compare the echo signal with a switching threshold in a threshold-value switch so that a signal is produced at the output of the threshold-value switch if the echo signal exceeds the threshold. The level of the switching threshold must be fixed in such a way that, on the one hand, it is high enough to suppress unwanted extraneous echoes but, at the same time, it should also exceed the switching threshold in the case of a strongly absorbing reflector of the echo signal since no indication is otherwise possible. Thus, it is possible to determine the distance between the ultrasound transducer and the reflector (or liquid object), from the spacing in time between the emitted signal and the echo signal.

In the second method, laser technology is used to measure the distance between two points. U.S. Pat. No. 6,624,881 describes a conventional laser distance-measuring device. The device comprises a microcontroller, a non-erasable memory, a mass memory, a keypad, a display, a radiation source, and a radiation receiver. The microcontroller controls the radiation source to emit a modulated laser beam. The laser beam is received by the radiation receiver after being reflected by a target object, and is modulated by the microcontroller. The time that the laser beam takes during the journey is recorded, and is multiplied by a propagation velocity of the laser beam to determine the distance that the device is distant from the target object. Data of measurement are stored in the mass memory, and the result is shown on the display. In addition, operation modes and correction algorithms, which are stored in the non-erasable memory, can be selected through the keypad for desired result of measurement.

In accordance with the present disclosure, an detachable electronic oil heating tank meter that is capable of monitoring, verifying, tracking, and recording a plurality of variables, including, but not limited to, the approximate amount of fuel in a heating tank, the approximate amount of fuel delivered, the approximate amount of fuel consumed, and the dates that fuel was delivered is described.

Fuel companies attempt to schedule their deliveries as efficiently as possible so that the largest possible amount of fuel oil can be sold to the customer at any given time without the danger of having the customer's supply become exhausted. By making larger quantity sales, it is possible for the fuel oil company to save costs by cutting down on the number of deliveries needed to service its customer. Under ideal conditions, fuel oil companies would desire to make deliveries approximately 1 to 2 days before the oil tank runs dry. However, changes in climate and customer requirements often vary so extensively that it is impossible to calculate deliveries that will run to within a day or two of the ideal condition. Therefore, the present disclosure provides a level detection and indicating apparatus connected to an electronic reading apparatus, which permits the owner of the heating oil tank to efficiently schedule deliveries closer to the day when the fuel oil supply will be exhausted. The present disclosure focuses on furnaces using oil and specifically on detachable electronic meters that are used on oil furnaces for monitoring a plurality of variables, including, but not limited to, the approximate amount of fuel in a heating tank, the approximate amount of fuel delivered, the approximate amount of fuel consumed, and the dates that fuel was delivered.

The detachable electronic meter is conveniently installed on a heating oil tank to determine the approximate amount of heating oil in the tank, the approximate amount of heating oil delivered, and the approximate amount of heating oil consumed over a predetermined period of time (the date can be rounded down to the nearest gallon, liter, pint, etc. A memory device may store a predetermined number of previous deliveries (dates and amounts of fuel delivered). A Central Processing Unit (CPU) may determine the approximate average consumption of fuel per day, per week, per month, and/or per year. The CPU can also track the dates of delivery, the times of delivery, and the amounts of delivery. A wireless communication device may transmit such data to the fuel tank user's personal computer or to a central processing station maintained by sellers and/or manufacturers' of fuel heating systems. A display screen located on the detachable electronic meter displays all the collected data that is stored in the memory.

DETAILED DESCRIPTION

The present disclosure describes fuel heating tank meters. The apparatuses and methods according to the present disclosure relate to electronic detachable oil heating tank meters that are capable of monitoring, verifying, tracking, and recording a plurality of variables, including, but not limited to, the approximate amount of fuel in a heating tank, the approximate amount of fuel delivered, the approximate amount of fuel consumed over a predetermined time period, and the dates that fuel was delivered.

Figure 1:
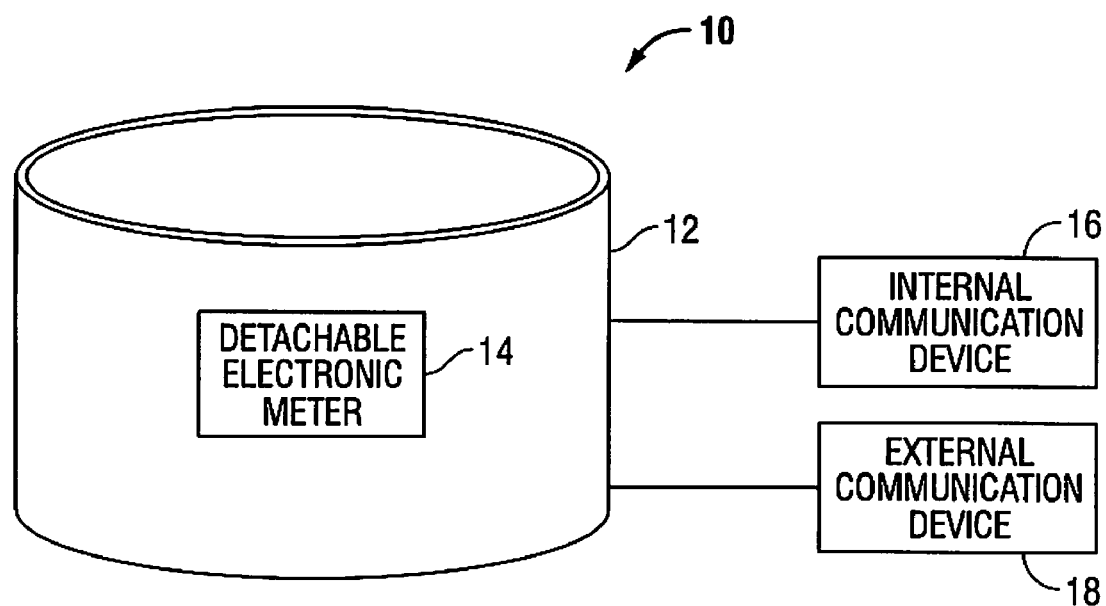
FIG. 1 is a perspective view showing a fuel heating system in accordance with the method of the present disclosure.

Referring to FIG. 1, a perspective view showing a fuel heating system in accordance with the method of the present disclosure is illustrated. The fuel heating system 10 includes a fuel tank 12, a detachable electronic meter 14, an internal communication device 16, and an external communication device 18.

The fuel tank 12 is the part of the system in which the fuel is stored and released into an engine. Fuel tanks range in size and complexity from a small plastic tank to a huge steel multi-chambered tank. Typically, a fuel tank must allow: (1) Filling (e.g., the fuel tank must be filled in a secure way), (2) Storage of fuel (e.g., the system must contain a given quantity of fuel and must avoid leakage and limit evaporative emissions), (3) Gauging (e.g., the remaining quantity of fuel in the tank must be measured or evaluated), (4) Venting (e.g., if over-pressure is not allowed, the fuel vapors must be managed through valves), and (5) Feeding of the engine (e.g., through a pump). The fuel tank 12 may be manufactured by using a variety of different materials (e.g., plastic, fiberglass, metals, etc.) that are corrosion resistant, fire-retardant, and protect against Ultraviolet (UV) light, and designed for long-term and trouble-free service.

The detachable electronic meter 14 is a device that measures the amount of fuel stored and supplied to the fuel tank system 10 via a measuring module 40 described below in FIGS. 2 and 3.

The internal communication device 16 is any type of wireless or non-wireless distribution, transmission, and/or reception system within a home. The internal communication device 16 may be a local system that includes a host computer having file storage capabilities. The file storage system stores an installation file of a corresponding application program, files to be updated, and various files to be transmitted when an application program is executed. When the detachable electronic meter 14 tracks, monitors, and verifies a plurality of variables, such information may be transmitted via the internal communication device 16 to the owner of the fuel heating system 10.

The external communication device 18 is any type of wireless or non-wireless distribution, transmission, and/or reception system that connects one or more housing establishments to central facilities of one or more fuel heating system sellers and/or distributors. The system may include a host computer, an authentication computer, a file storage computer, and a plurality of client computers. The host computer transmits data needed for executing an application program to a client computer connected through a network such that the client computer can execute the application program.

The authentication computer performs an authentication procedure in response to access information from the client computer, which accesses the host computer. The authentication computer transmits a result of the authentication procedure to the host computer. If the client computer accessing the host computer is authentic, the client computer can receive the data needed for executing the application program from the host computer and then execute the application program.

The file storage computer stores an installation file of a corresponding application program, files to be updated and various files to be transmitted when the application program is executed. Under the control of the host computer, the files are transmitted in a background process of the application program when the application program is executed.

The host computer, the authentication computer and the file storage computer can be physically or logically separated and installed.

The client computer can be connected to the host computer through a sub-network such as an Internet cafe, etc. or another network such that the client computer can receive data needed for executing the application program from the host computer and then execute the application program.

Preferably wireless communication is desired between a fuel heating system owner and a manufacturer of home fuel heating systems. Wireless communication systems are utilized to facilitate communication between a wireless mobile unit and other wireless mobile units as well as between wireless mobile units and customers of wired units, such as those attached to a public switched telephone network (PSTN). Wireless communication systems operate according to communication protocols within allocated frequency bands and on particular radio frequency (RF) channels contained within the frequency bands. Frequency bands currently in use in North America and around the world for wireless communications include the 800 MHz (cellular) band and the 1900 MHz (personal communication services (PCS)) band among others.

When the detachable electronic meter 14 tracks, monitors, and verifies a plurality of variables, such information may be transmitted via the external communication device 18 to the owner of the fuel heating system 10. Therefore, the detachable electronic meter 14 located on the fuel tank 12 can send information to a local source, such as a home owners personal computer via the internal communication device 16 or send information to a fuel tank system seller and/or manufacturer via the external communication device 18.

Figure 2:
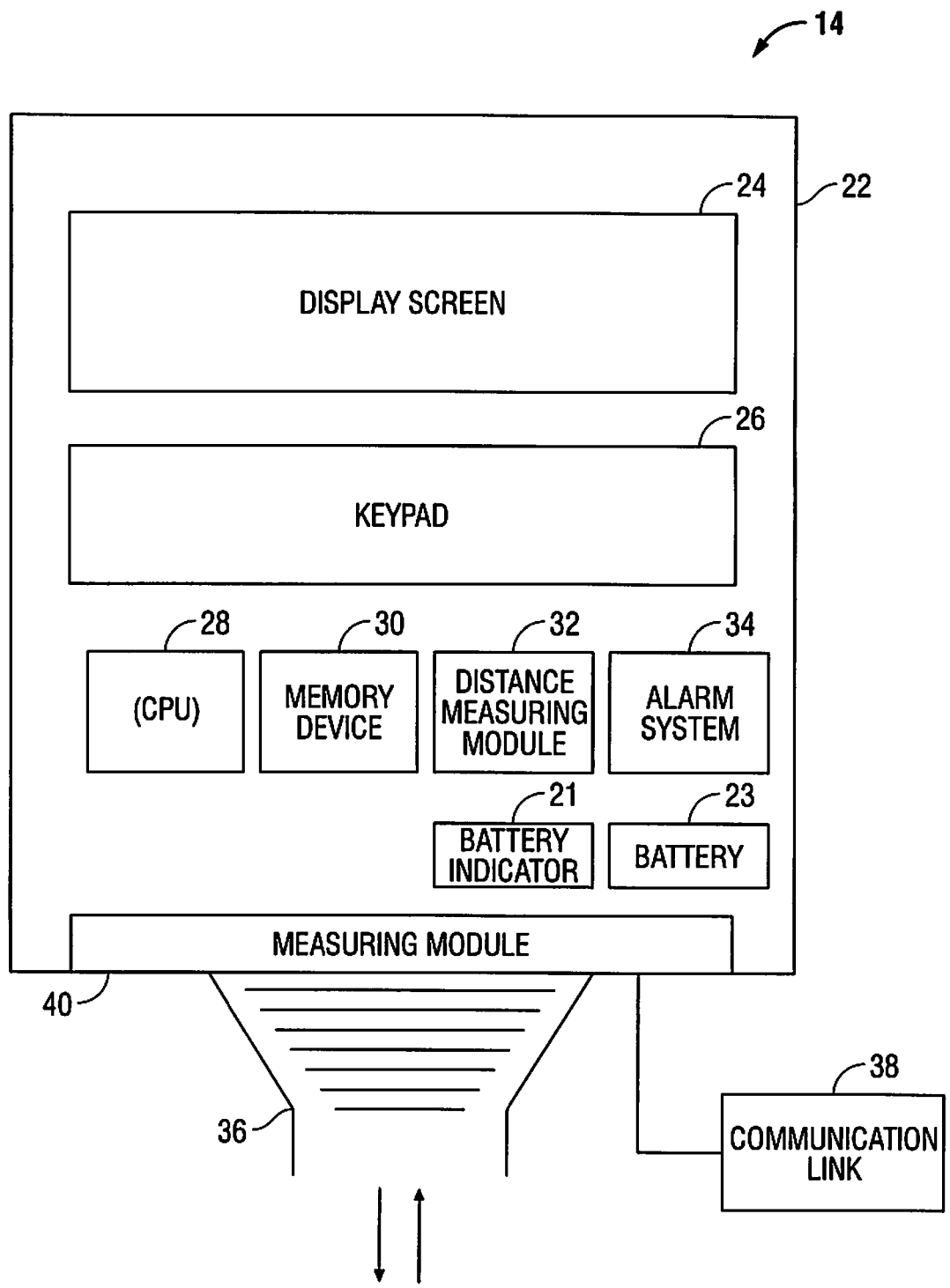
FIG. 2 is a perspective view showing a detachable electronic meter attached to the fuel heating system of FIG. 1, in accordance with the method of the present disclosure.

Referring to FIG. 2, a perspective view showing a detachable electronic meter attached to the fuel heating system 10 of FIG. 1, in accordance with the method of the present disclosure is illustrated. The detachable electronic meter 14 includes an enclosure 22, which has a display screen 24, a keypad 26, and a battery indicator 21, all visible to the user. Within the enclosure 22, there is included a Central Processing Unit (CPU) 28, a memory device 30, a distance measuring module 32, an alarm system 34, and a battery 23. The detachable electronic meter 14 also includes a communication link 38 for sending information to the owner of the fuel heating system 10 (shown in FIG. 1) or for sending information to the fuel heating system seller and/or manufacturer/distributor. The detachable electronic meter 14 further includes a measuring module 40 and a connection link 36 for connecting the fuel tank 12 (shown in FIG. 1) with the detachable electronic meter 14.

The detachable electronic meter 14 may be attached or detached from any existing fuel heating system 10 (shown in FIG. 1). This is a very convenient configuration that allows pre-existing owners of home fuel heating systems to purchase only the electronic meter and self-install it at their own convenience.

Display screen 24 may be any of a variety of display devices. The electronic display apparatuses are generally divided into emissive display apparatuses and non-emissive display apparatuses. The emissive display apparatuses display light information signals through emitting lights, and the non-emissive display apparatus displays the light information signals through reflection, scattering or interference.

The emissive display apparatuses include a cathode ray tube (CRT), a plasma display panel apparatus (PDP), a light emitting diode (LED) and an electroluminescent display apparatus (ELD). The emissive display apparatuses are called as active display apparatuses.

The non-emissive display apparatuses, called as passive display apparatuses, include a liquid crystal display apparatus (LCD), an electrochemical display apparatus (ECD) and an electrophoretic image display apparatus (EPID).

Display devices used for information providing apparatuses, such as in the present disclosure, include self-emitting displays such as light emitting diodes (LEDs), electroluminescences (ELs), vacuum fluorescent displays (VFDs), field emission displays (FEDs) and plasma panel displays (PDPs) and non-emitting displays such liquid crystal displays (LCDs) requiring light source.

Keypad 26 may include a group of alphanumeric data characters located on buttons spaced from one another substantially about the periphery of the display screen 24, for data selection. Alternate dialing or data entry devices such as grid-like keypads, voice recognition systems, touch screen entry systems, separable keypads, etc. are within the scope of the present disclosure and may be incorporated at any location along the enclosure 22 of the detachable electronic meter 14. In various aspects of the present methods and systems, the user of the detachable electronic meter 14 can create messages by entering text, numbers, or an alphanumeric message using a keypad or keyboard that is operatively associated with the wireless device.

The CPU 28 may be run by a variety of algorithms that are a finite list of well-defined instructions for accomplishing some task that, given an initial state, will terminate in a defined end-state. The algorithm can be a recursive algorithm or a series or paralleled algorithm or any other appropriate type of algorithm according to the variables desired to be computed.

The detachable electronic meter 14 is conveniently installed on a heating oil tank 12 to determine the approximate amount of heating oil in the tank, the approximate amount of heating oil delivered, and the approximate amount of heating oil consumed over a predetermined period of time. The amounts can be rounded down to the nearest gallon, liter, pint, etc. The detachable electronic meter 14 is designed as a replacement device for replacing old models of mechanical meters found on fuel heating tanks. A memory device 30 may store a predetermined number of previous deliveries. The CPU 28 may determine the approximate average consumption of fuel per day, per week, per month, and/or per year. The CPU 28 can also track the dates of delivery, the times of delivery, and the approximate amounts of delivery. A communication link 38 may transmit such data to the fuel tank user's personal computer or to a central processing station maintained by sellers and/or manufacturers' of fuel heating systems. A display screen 24 located on the detachable electronic meter displays all the collected data that is stored in the memory device 30. The display screen 24 also may display whether the fuel tank 12 (shown in FIG. 1) is full, half full, or empty. As a result, the detachable electronic meter 14 of the present disclosure is contrived to be installed on a heating oil tank 12 in place of a current analog or mechanical meter, which primarily displays whether the oil tank is full, half-full, or empty.

The distance measuring module 32 may be an ultrasonic measuring module as described in FIG. 4 below or a laser measuring module as described in FIG. 5 below.

The alarm system 34 may be a buzzer or other audible device. While alarm system 34 is depicted as an audible device mounted inside enclosure 22, it is appreciated that other alarm devices may be employed, such as a flashing light for example, which may be mounted outside of enclosure 22 for providing a visual alarm signal.

The communication link 38 is any type of wireless or non-wireless distribution, transmission, and/or reception system that connects one or more housing establishments to central facilities of one or more fuel heating systems sellers and distributors and/or that sends information to a home computer. The system may include a host computer, an authentication computer, a file storage computer, and a plurality of client computers. The host computer transmits data needed for executing an application program to a client computer connected through a network such that the client computer can execute the application program.

Preferably wireless communication is desired between a fuel heating system owner and a manufacturer of home fuel heating systems. Wireless communication systems are utilized to facilitate communication between a wireless mobile unit and other wireless mobile units as well as between wireless mobile units and customers of wired units, such as those attached to a public switched telephone network (PSTN). Wireless communication systems operate according to communication protocols within allocated frequency bands and on particular radio frequency (RF) channels contained within the frequency bands.

Figure 3:
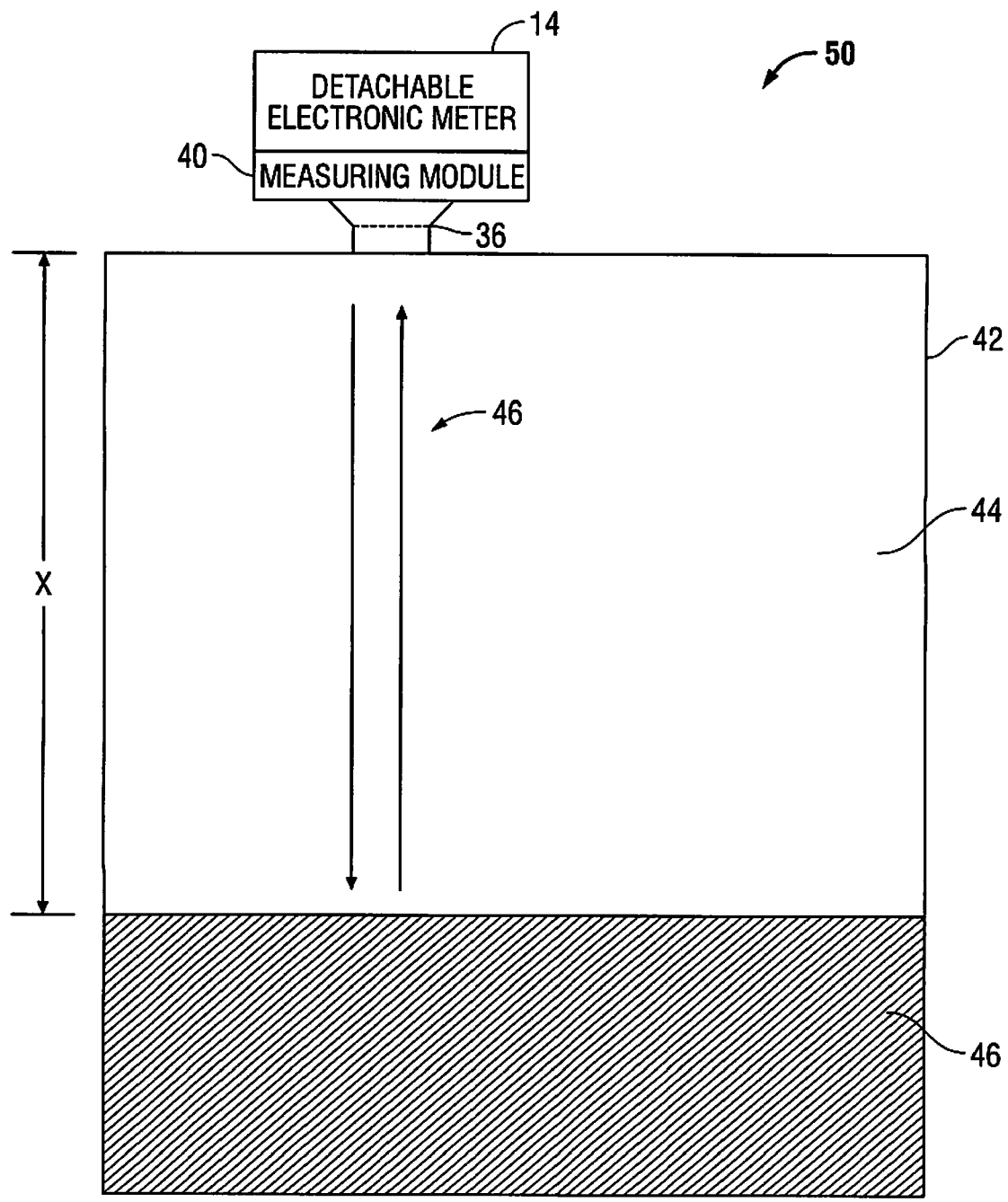
FIG. 3 is a perspective view showing a measuring module removably attachable on an upper portion of the fuel heating system of FIG. 1, in accordance with the method of the present disclosure.

Referring to FIG. 3, a perspective view showing a measuring module attached on an upper portion of the fuel heating system of FIG. 1, in accordance with the present disclosure is illustrated. The fuel heating system 50 includes a fuel tank 42, the electronic meter 14 having a distance measuring module 40 and a connecting link 36, air or vacuum 44, and a fuel (e.g., oil) 46. "X" denotes the distance 48 between the distance measuring module 40 and the fuel 46. In this exemplary embodiment, the distance measuring module 40 is located on the upper portion of the fuel heating system 50. The distance measuring module 40 may be located at any location on the upper portion of the fuel heating system 50. The exact location of the distance measuring module 40 can be determined by either the manufacturer and/or seller. The distance measuring module 40 is connected to the fuel tank 42 via the connecting link 36 in order to determine the approximate amount of fuel 46 located within the fuel tank 42. The measuring module 40 emits a signal 48 that is transmitted from the fuel 46 and sent back to the measuring module 40 for further processing. This process aids in the determination of whether the fuel tank 42 is full, half-full, or empty.

Figure 4:
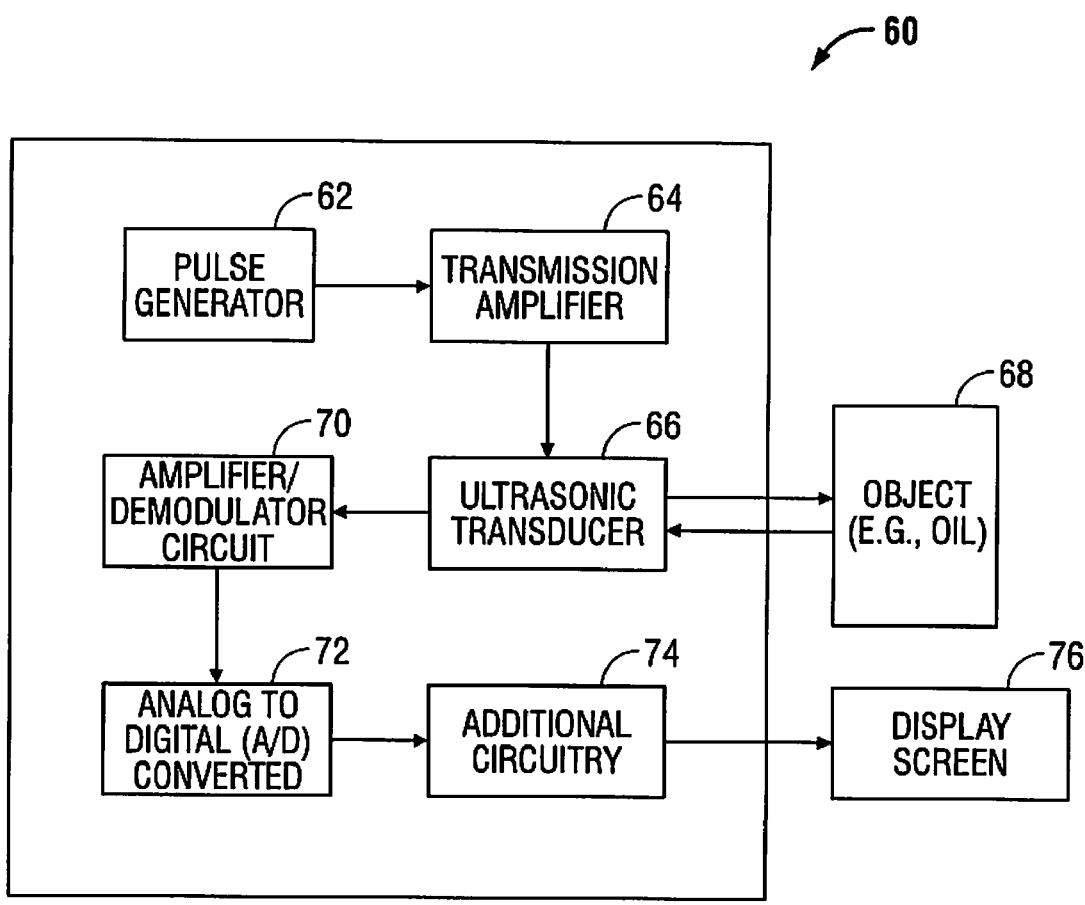
FIG. 4 is a perspective view showing a measuring module using ultrasonic technology, in accordance with the present disclosure.

Referring to FIG. 4, a perspective view showing a measuring module using ultrasonic technology, in accordance with the present disclosure is illustrated. The ultrasonic measuring module 60 includes a pulse generator 62, a transmission amplifier 64, an ultrasonic transducer 66, object (e.g., oil) 68, an amplifier/demodulator circuit 70, an analog to digital (A/D) converted 72, additional circuitry 74, and a display screen 76.

A transmission pulse is generated by the pulse generator 62 and sent via the transmission amplifier 64 to the ultrasonic transducer 66. An envelope curve is formed by means of the amplifier/demodulator circuit 70 from the sound signal reflected by the object 68 of the measurement. The transmission amplifier 64, the ultrasonic transducer 66 and the amplifier/demodulator circuit 70 together form an ultrasonic transmission/reception unit. After the dead time of the ultrasonic transmission/reception unit has elapsed, additional circuitry 74, such as a gate circuit, is enabled so that all echoes arriving after this dead time are converted into digital pulses by the A/D converter 72. The dead time is the time interval following the start of the transmitter pulse during which the amplifier is unable to respond to incoming signals, when using the pulse echo method, because of saturation by the transmitter pulse.

The ultrasonic transmission/reception unit composed of elements 62, 64, and 66 is in communication with the CPU 28 (shown in FIG. 2). The CPU 28 implements decoding algorithms that enable lookup table data retrieval functionality. The memory device 30 is used for storing the lookup table data that correlates the echo pulses arriving from the fuel 46 (shown in FIG. 3) to the amount of fuel remaining in the fuel tank 42 and/or the amount of fuel consumed to date by the user of the fuel tank 42. The lookup table may include data pertaining to predetermined distance values that are correlated to time arrival values of echo pulses in order to determine whether the fuel tank 42 is full, half-full, or empty, and/or the amount of fuel in the fuel tank 42 (e.g., number of gallons or liters of fuel therein). The data values retrieved by the measuring module 60 (shown in FIG. 4) are compared to the predetermined data values stored in the lookup table in order to provide fuel-related data to the user of the fuel tank 42, such as the approximate amount of fuel in the fuel tank 42 and approximate amount of fuel consumed over a predetermined time period) by displaying the fuel-related data on the display screen 24 (shown in FIG. 2). Therefore, operational information relating to the fuel tank 42 can be accessed by the CPU 28 via the lookup table located in memory device 30 to determine the approximate amount of fuel 46 located in the fuel tank 42 and/or the approximate amount of fuel 46 consumed by the user of the fuel tank 42 over a predetermined time period. The lookup table may be a table of values upon which the CPU 28 performs interpolation/extrapolation techniques or it may be a transfer function upon which the CPU 28 performs a calculation.

Figure 5:
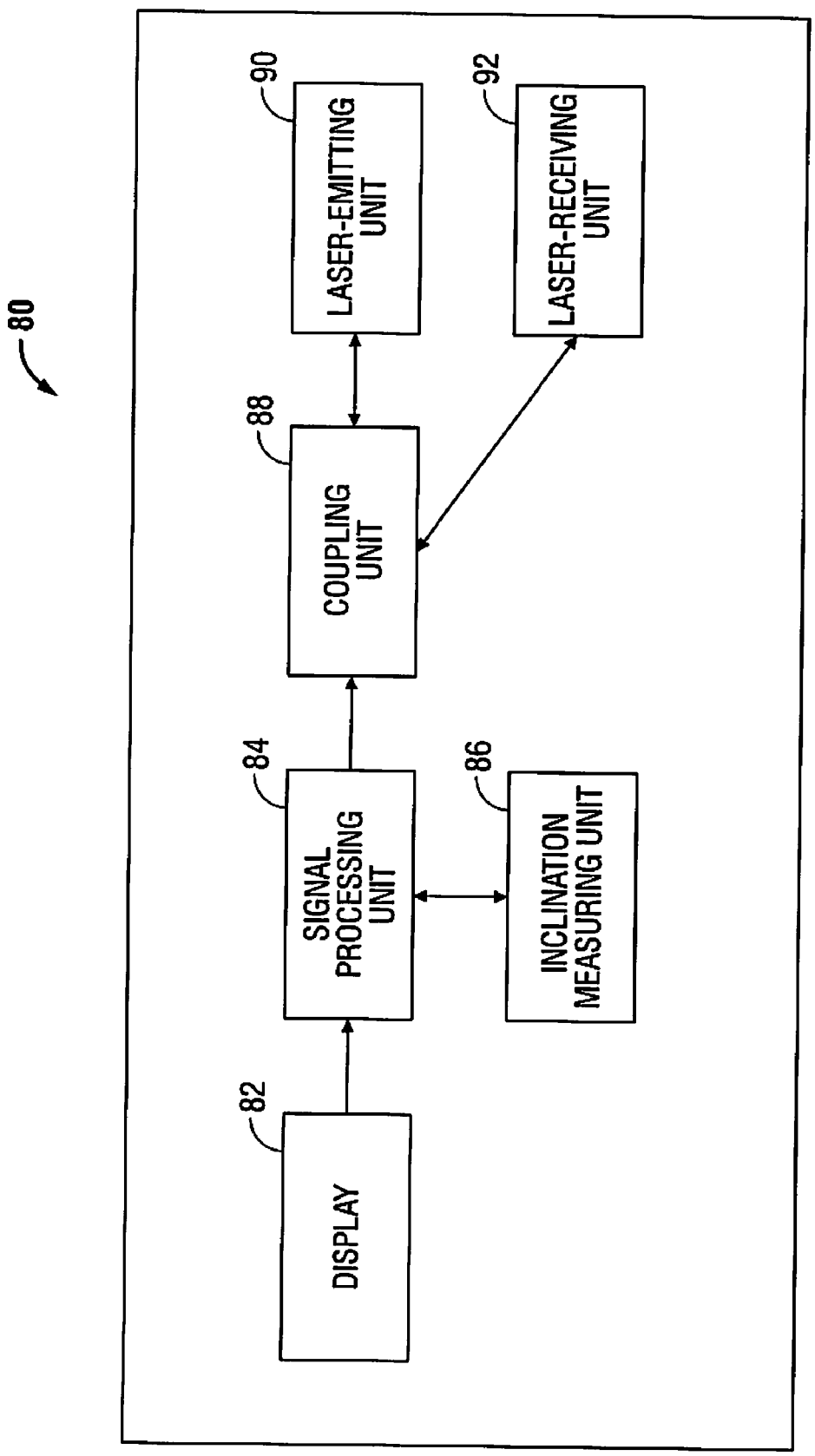
FIG. 5 is a perspective view showing a measuring module using laser technology, in accordance with the present disclosure.

Referring to FIG. 5, a perspective view showing a measuring module using laser technology, in accordance with the present disclosure is illustrated. The laser measuring module 80 includes a display 82, a signal processing unit 84, an inclination measuring unit 86, a coupling unit 88, a laser-emitting unit 90, and a laser-receiving unit 92.

The laser-emitting unit 90 connects with the coupling unit 88 and the signal-processing unit 84. The laser-receiving unit 92 also connects with the coupling unit 88 and the signal-processing unit 84. The coupling unit 88, which is connected to both the laser-emitting unit 90 and the laser-receiving unit 92, is connected to the signal-processing unit 84. The inclination-measuring unit 86 connects with the signal-processing unit 84. The signal-processing unit 84 controls the inclination-measuring unit 86, the coupling unit 88, and the laser-emitting unit 90, receives signals from the laser-receiving unit 92 and the inclination-measuring unit 86, and processes the received signals. The display 82 connects with the signal-processing unit 84, receives the result of processing performed by the signal-processing unit 84, and displays the processing result.

The laser-emitting unit 90 preferably comprises a laser diode driver (LD driver) and a laser diode (LD). The LD may connect to a Complex Programmable Logic Device (CPLD) through the LD driver. The CPLD generates an oscillating control signal to control the LD driver, and drives the LD to emitting a laser beam.

The laser-receiving unit 92 preferably comprises an avalanche photo diode (APD), a Reference avalanche photo diode (Ref APD), a pair of band-pass filters and amplifiers, and a high voltage. The APD and the Ref APD preferably connect to an analog-to-digital converter that constitutes in part the signal-processing unit 84 through the amplifiers. The APD and the Ref APD receive a laser beam and convert the received light signals into electronic signals.

The coupling unit 88 preferably comprises a coupler and a power amplifier. The coupler connects with the APD and the Ref APD, and connects to the CPLD through the amplifiers. An oscillating signal from the CPLD is preferably coupled with an output signal from the APD and a reference output signal from the Ref APD through the coupler, so that the signal-processing unit 84 can calculate the time that the laser beams takes during the journey from the LD to the target object (e.g., fuel) and then back to the APD.

The coupling unit 88 is in communication with the CPU 28 (shown in FIG. 2). The CPU 28 implements decoding algorithms that enable lookup table data retrieval functionality. The memory device 30 is used for storing the lookup table data that correlates the echo pulses arriving from the fuel 46 (shown in FIG. 3) to the amount of fuel remaining in the fuel tank 42 and/or the amount of fuel consumed to date by the user of the fuel tank 42. The lookup table may include data pertaining to predetermined distance values that are correlated to time arrival values of echo pulses in order to determine whether the fuel tank 42 is full, half-full, or empty, and/or the approximate amount of fuel in the fuel tank 42 (e.g., number of gallons or liters of fuel therein). The data values retrieved by the measuring module 80 (shown in FIG. 5) are compared to the predetermined data values stored in the lookup table in order to provide fuel-related data to the user of the fuel tank 42, such as the approximate amount of fuel in the fuel tank 42 and approximate amount of fuel consumed over a predetermined time period) by displaying the information on the display screen 24 (shown in FIG. 2). Therefore, operational information relating to the fuel tank 42 can be accessed by the CPU 28 via the lookup table located in memory device 30 to determine the approximate amount of fuel 46 located in the fuel tank 42 and/or the approximate amount of fuel 46 consumed by the user of the fuel tank 42 over a predetermined time period. The lookup table may be a table of values upon which the CPU 28 performs interpolation/extrapolation techniques or it may be a transfer function upon which the CPU 28 performs a calculation.

The inclination-measuring unit 86 connects with the signal-processing unit 84, and preferably detects an inclination angle that the laser beam emitted from the LD deflects from the horizontal.

The signal-processing unit 84 preferably comprises a Digital Signal Processor (DSP), a voltage controlled oscillator (VCXD), and the CPLD. The DSP preferably has a processing unit and the converter. The converter receives an analog signal from the laser-receiving unit 92 and the inclination-measuring unit 86, and then converts the analog signal into a digital signal. The processing unit processes the digital signal and sends the result of processing to the display 82. The CPLD is preferably composed of a frequency synthesizer and a pair of switches. The frequency synthesizer and the switches connect with a processing unit, and are controlled by the processing unit. The VCXD connects with and provides an oscillating signal for the frequency synthesizer.

The display 82 connects with the DSP and receives and displays the results from the DSP.

Advantages provided by the methods and apparatuses of the present disclosure is that little or no training/learning is required by the user of the detachable electronic meter; the detachable electronic meter utilized by each method is inexpensive to construct and its respective small size makes it convenient for storage and use; provides the ability to monitor a large set of variables; the methods pertain to a detachable electronic meter that is conveniently installed on a heating oil tank to determine the approximate amount of heating oil in the tank, the approximate amount of heating oil delivered, and the approximate amount of heating oil consumed over a predetermined period of time; the memory device may store a predetermined number of previous deliveries; the CPU may determine the approximate average consumption of fuel per day, per week, per month, and/or per year; the CPU can also track the dates of delivery, the times of delivery, and the approximate amounts of fuel delivery, the wireless communication device may transmit such data to the fuel tank user's personal computer or to a central processing station maintained by sellers and/or manufacturers'/distributors' of fuel heating systems; the display screen located on the detachable electronic meter may display all the collected data that is stored in the memory; an ultrasonic measuring module may be utilized; and a laser measuring module my be utilized.

While the present disclosure has been described with reference to exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiments disclosed for carrying out this disclosure, but that the disclosure will include all embodiments falling within the scope of the appended claims.

The invention claimed is:

1. A detachable electronic meter for tracking, verifying, and recording one or more variables, the meter comprising:
   a distance measuring module for measuring a distance of an object by sending a first signal from the distance measuring module toward the object and receiving a second signal from the object;
   an inputting device for inputting information concerning the one or more variables via a keypad;
   a central processing unit (CPU) for determining the one or more variables;
   a display screen for displaying information concerning the one or more variables provided by the CPU;
   an alarm system for notifying a user of the detachable electronic meter with information regarding the one or more variables;
   a connecting link for connecting the detachable electronic meter to a fuel tank system;
   a housing adapted to be removably attachable to the fuel tank wherein the housing at least partially encloses the electronic meter; and
   a communication device for transmitting first data from the detachable electronic meter to one or more external fuel, fuel tank, and fuel-software dependent sources;

wherein the first data is authenticated by an authentication device at the fuel-software dependent source before communication with the one or more external fuel and fuel tank dependent sources is permitted;

wherein, after authentication of the first data, the one or more external fuel, fuel tank, and fuel-software dependent sources selectively transmit second data to the detachable electronic meter, the second data including automatic real-time updates regarding (i) pre-existing application programs and (ii) new application programs, where both types of application programs relate to fuel monitoring and fuel tank maintenance; and wherein the automatic real-time updates are stored either in a local storage station or a remote storage station, where both storage stations are independent of a location of the external sources.

2. The electronic meter according to claim 1, wherein the distance measuring unit is an ultrasonic measuring module, the first signal is an ultrasonic pulse, and the second signal is an echo pulse.

3. The electronic meter according to claim 1, wherein the distance measuring unit is a laser measuring module, and the first and second signals are laser signals.

4. The electronic meter according to claim 1, further comprising selecting the one or more variables from a group consisting of:
   an approximate amount of fuel in the fuel heating tank;
   an approximate amount of fuel previously deposited in the fuel heating tank;
   an approximate amount of fuel consumed by a user of the fuel heating tank;
   a date of delivery of the fuel previously deposited in the fuel heating tank; and
   an approximate average consumption of fuel by the user of the fuel heating tank per predetermined period of time.

5. The electronic meter according to claim 1, wherein the communication device is a wireless communication device.

6. The electronic meter according to claim 5, wherein the one or more external fuel, fuel tank, and fuel-software dependent sources are one or more manufacturers or distributors of fuel heating tanks, fuel, and fuel monitoring software.

7. The electronic meter according to claim 1, further comprising indicating to a user the battery life of the electronic meter via a battery indicator.

8. An electronic meter for measuring an amount of fuel in a fuel tank, the electronic meter comprising:

a signal generator for generating and propagating a signal via an opening of the fuel tank;

a central processing unit (CPU) for determining the amount of fuel in the fuel tank based on a return signal; and a comparing means for comparing the return signal to predetermined values in a lookup table for identifying an approximate amount of fuel in the fuel tank;

a housing adapted to be removably attachable to the fuel tank wherein the housing are least partially encloses the electronic meter; and a communication device for transmitting first data from the detachable electronic meter to one or more external fuel, fuel tank, and fuel-software dependent sources;

wherein the first data is authenticated by an authentication device at the fuel-software dependent source before communication with the one or more external fuel and fuel tank dependent sources is permitted;

wherein, after authentication of the first data, the one or more external fuel, fuel tank, and fuel-software dependent sources selectively transmit second data to the detachable electronic meter, the second data including automatic real-time updates regarding (i) pre-existing application programs and (ii) new application programs, where both types of application programs relate to fuel monitoring and fuel tank maintenance; and wherein the automatic real-time updates are stored either in a local storage station or a remote storage station, where both storage stations are independent of a location of the external sources.

9. The electronic meter according to claim 8, further comprising:
   inputting information concerning the amount of fuel in the fuel tank via a keypad;
   displaying information concerning the amount of fuel in the fuel tank provided by the CPU via a display screen; and
   notifying a user of the electronic meter with information regarding the amount of fuel in the fuel tank via an alarm system.

10. The electronic meter according to claim 8, wherein the signal generator is an ultrasonic measuring module.

11. The electronic meter according to claim 8, wherein the signal generator is a laser measuring module.

* * * * *